United States Patent
Li et al.

(10) Patent No.: US 11,294,138 B2
(45) Date of Patent: Apr. 5, 2022

(54) CAMERA MODULE OF ELECTRONIC DEVICE

(71) Applicant: TRIPLE WIN TECHNOLOGY(SHENZHEN) CO. LTD., Shenzhen (CN)

(72) Inventors: Shuai-Peng Li, Shenzhen (CN); Jing-Wei Li, Guangdong (CN); Sheng-Jie Ding, Guangdong (CN); Shin-Wen Chen, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 427 days.

(21) Appl. No.: 16/369,068

(22) Filed: Mar. 29, 2019

(65) Prior Publication Data
US 2020/0292778 A1    Sep. 17, 2020

(30) Foreign Application Priority Data
Mar. 13, 2019 (CN) .......................... 201910190764.4

(51) Int. Cl.
*G02B 7/02* (2021.01)

(52) U.S. Cl.
CPC .................................... *G02B 7/021* (2013.01)

(58) Field of Classification Search
CPC .......... G02B 7/02; G02B 7/021; G02B 7/026; G02B 7/025; G02B 7/022; G02B 7/023; G02B 7/003; G02B 7/08; G02B 13/001; G02B 13/0085; G02B 7/04; G02B 23/2476; G02B 3/00; G02B 7/102; G02B 13/003; G02B 27/0018; G02B 27/62; G02B 7/004; G02B 13/0035; G02B 13/006; G02B 13/18; G02B 25/002; G02B 27/0006; G02B 27/0025; G02B 3/0062; G02B 3/0075; G02B 5/003; G02B 7/10; G02B 7/14; G02B 7/1825; G02B 9/12; G02B 13/0025; G02B 13/004; G02B 13/146; G02B 19/0076; G02B 21/33; G02B 23/12; G02B 23/16; G02B 23/2423; G02B 23/243; G02B 23/2446; G02B 23/2492; G02B 23/26; G02B 25/005; G02B 25/008; G02B 26/124; G02B 26/125; G02B 27/646; G02B 3/0018; G02B 3/0056; G02B 3/0068; G02B 3/0081; G02B 3/0087; G02B 5/005; G02B 6/32; G02B 6/3652; G02B 6/3656;
(Continued)

(56) References Cited
U.S. PATENT DOCUMENTS

2018/0120583 A1\*  5/2018  Avivi ................. G02B 7/08
2019/0121050 A1\*  4/2019  Park ................. G03B 17/02

FOREIGN PATENT DOCUMENTS

KR     10-1361446 B1    2/2014

\* cited by examiner

*Primary Examiner* — Collin X Beatty
*Assistant Examiner* — Grant A Gagnon
(74) *Attorney, Agent, or Firm* — ScienBiziP, P.C.

(57) ABSTRACT

A camera module of an electronic device includes a lens body and a bracket. The lens body includes a base mount. The bracket includes a main body and a conductive member. The main body is made of electrically non-conductive material and is configured to fixedly mount the lens body. The conductive member is received within the main body and is configured to electrically couple the base mount to a housing of the electronic device to discharge electric charge accumulated on the base mount.

14 Claims, 3 Drawing Sheets

(58) Field of Classification Search
CPC .. G02B 6/3829; G02B 6/3853; G02B 6/3885; G02B 6/4214; G02B 6/4225; G02B 6/4226; G02B 6/4237; G02B 6/4249; G02B 6/43; G02B 7/00; G02B 7/001; G02B 7/105
USPC .......................................................... 359/819
See application file for complete search history.

CAMERA MODULE OF ELECTRONIC DEVICE

FIELD

The subject matter herein generally relates to camera modules, and more particularly to a camera module of an electronic device having improved electrical discharge ability.

BACKGROUND

Generally, a housing of a camera module is made of metal. When the camera module is in operation, an internal coil is energized, and the housing may accumulate electrical charge. The accumulated electrical charge may damage internal components of the camera module. A metal bracket of the related art used for discharging the accumulated charge is high in cost, heavy in weight, and may interfere with operation of an antenna of the electronic device.

BRIEF DESCRIPTION OF THE DRAWINGS

Implementations of the present disclosure will now be described, by way of embodiments, with reference to the attached figures.

DETAILED DESCRIPTION

Figure 1:
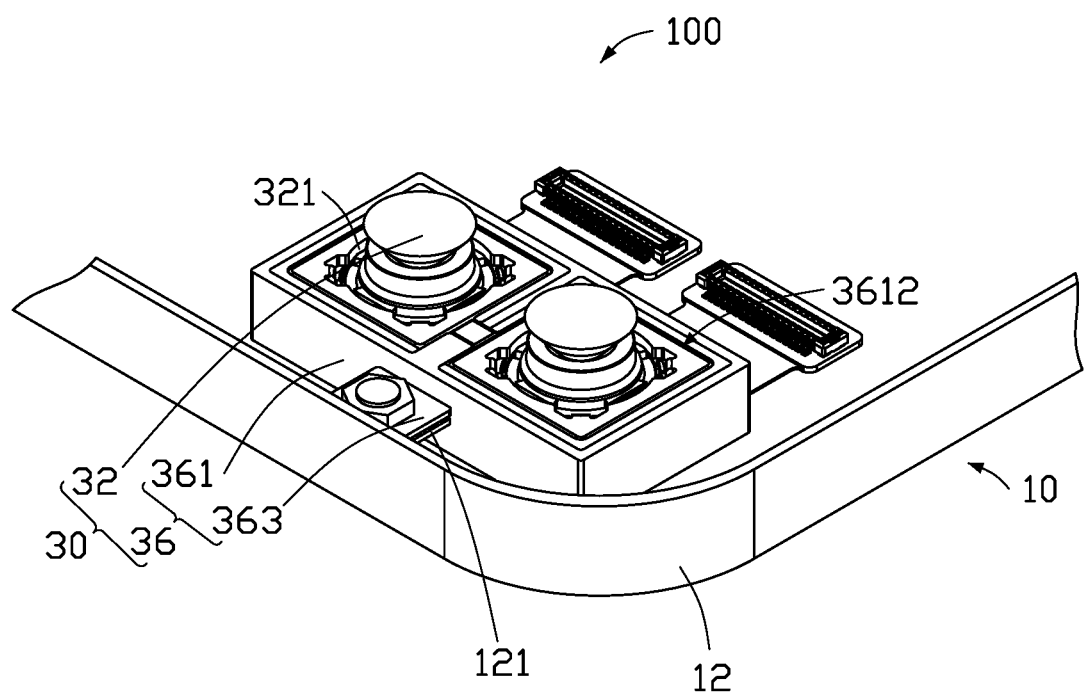
FIG. 1 is a partial cutaway view of an embodiment of a camera module of an electronic device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
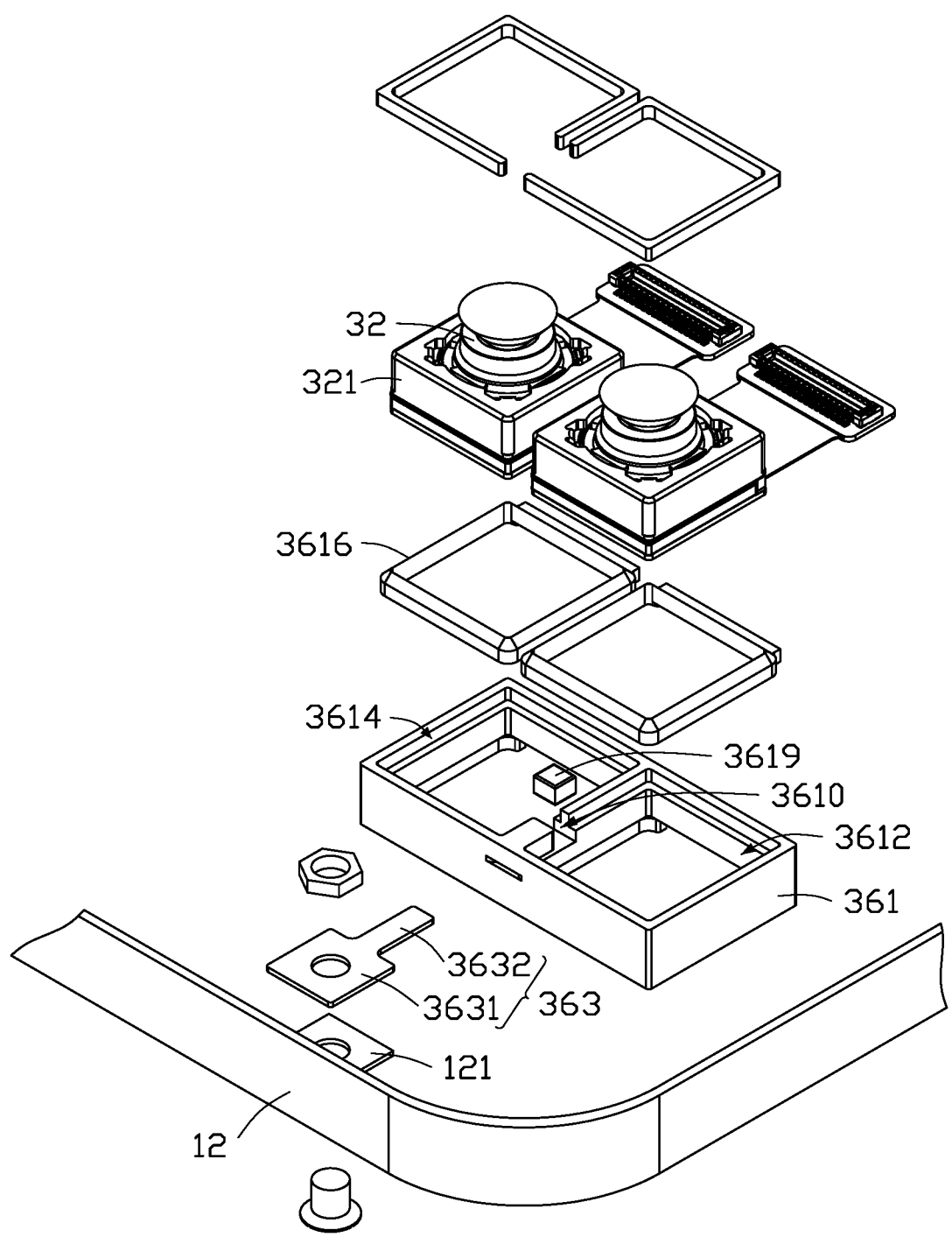
FIG. 2 is an exploded, isometric view of the camera module in FIG. 1.

FIGS. 1-2 show an embodiment of an electronic device 100. In the illustrated embodiment, the electronic device 100 is a mobile phone, but is not limited thereto. It should be understood that FIG. 1 does not illustrate every component of the electronic device 100, and the electronic device 100 may include other components, such as a circuit board, a sound system, an input/output port, a battery, an operating system, and the like.

The electronic device 100 includes a housing 10 and a camera module 30 mounted in the housing 10. The housing 10 includes a middle frame 12.

The camera module 30 includes a lens body 32 and a bracket 36. The lens body 32 is used for capturing an image. The lens body 32 includes a base mount 321 made of metal. A cross-sectional shape of the base mount 321 is substantially rectangular. The bracket 36 is fixed to a bottom plate (not shown) of the housing 10. The bracket 36 receives and fixedly mounts the lens body 32. In one embodiment, the bracket 36 is attached to the bottom plate, but is not limited thereto.

In one embodiment, the camera module 30 is a dual camera module including two lens bodies 32. It can be understood that in other embodiments, a quantity of the lens bodies 32 is at least one, and a cross-sectional shape of the base mount 321 may be other shapes, such as cylindrical or the like. In one embodiment, the camera module 30 includes two auto focus (AF) lenses, but is not limited thereto. In other embodiments, the camera module 30 may include at least one fixed focus (FF) lens.

The bracket 36 includes a main body 361 and a conductive member 363. The main body 361 is made of plastic and is configured to fixedly mount the base mount 321. The conductive member 363 is received in the main body 361 and couples the base mount 321 to the casing 10. The conductive member 363 is made of metal for discharging electric charge accumulated on the base mounts 321 to the casing 10. It can be understood that in other embodiments, the conductive member 363 can be made of another material capable of conducting electricity.

In one embodiment, a cross-sectional shape of the main body 361 is substantially rectangular. The main body 361 defines two spaced apart mounting holes 3612. A cross-sectional shape of each of the mounting holes 3612 is substantially square, and each mounting hole 3612 penetrates through opposite surfaces of the main body 361. Each mounting hole 3612 is configured to receive one lens body 32 to be fixedly mounted in the mounting hole 3612.

In one embodiment, two inner walls of each mounting hole 3612 are recessed to define a recessed portion 3614. After the lens body 32 is received within the mounting hole 3612, the recessed portion 3614 is filled with a colloid 3616 to fix the lens body 32 within the main body 361. It can be understood that in other embodiments, the recessed portion 3614 can be omitted as long as the lens body 32 can be fixed within the mounting hole 3612.

In one embodiment, the conductive member 363 includes a mounting end 3631 and a coupling end 3632. The mounting end 3631 and the coupling end 3632 are both substantially planar rectangular. A width of the coupling end 3632 is greater than a spacing between the two mounting holes 3612. A width of the mounting end 3631 is greater than the width of the coupling end 3632. The coupling end 3632 is received in the main body 361, and two sides of the coupling end 3632 respectively extend into the two mounting holes 3612.

In one embodiment, a protrusion block 121 is arranged on an inner side of the middle frame 12. The mounting end 3631 can be locked to the protrusion block 121 by a screw. It can be understood that in other embodiments, the protrusion block 121 can be omitted, and the conductive member 363 can be fixed to the middle frame 12 by solder, conductive adhesive, or the like.

Figure 3:
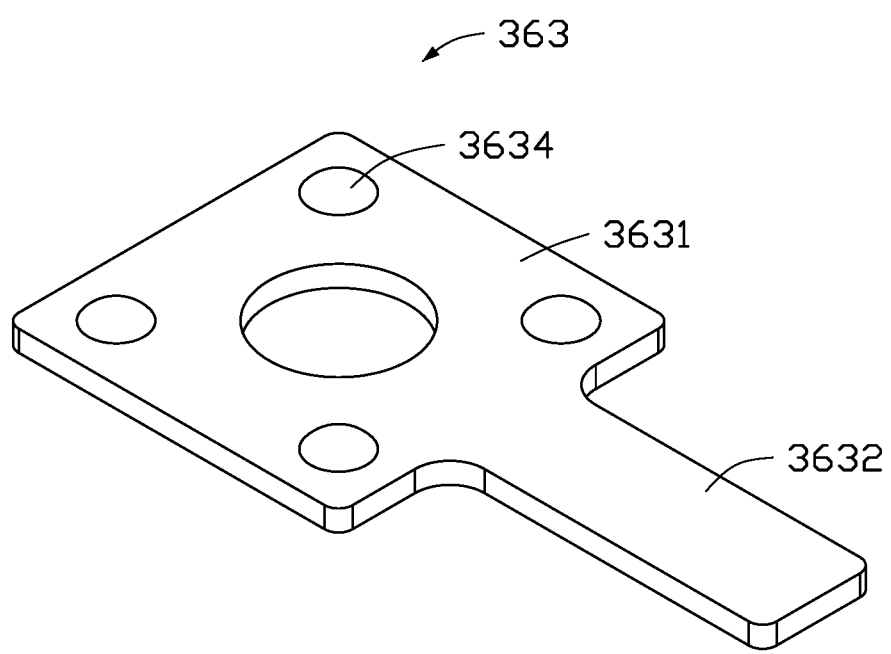
FIG. 3 is an isometric view of a conductive member of the camera module.

Referring to FIG. 3, the mounting end 3631 includes a plurality of protrusions 3634 configured to improve contact with the protrusion block 121. In other embodiments, the protrusions 3634 may be omitted.

In one embodiment, the main body 361 defines a mounting slot 3610. The mounting slot 3610 communicates with the two mounting holes 3612. The conductive member 363 inserted into the main body 361 is partially received within the mounting slot 3610. The mounting slot 3610 is filled with a conductive adhesive 3619. The conductive adhesive 3619 couples the two base mounts 321 and the conductive member 363 together to enhance electrical coupling therebetween.

In one embodiment, the bracket 36 is made by insert molding. After the conductive member 363 is placed in a mold, plastic is injected into the mold to form the main body 361. It can be understood that in other embodiments, the bracket 36 can be made by other means, such as by inserting the conductive member 363 into the main body 361 after forming the main body 361.

The camera module 30 of the electronic device 100 includes the conductive member 363 inserted in the main body 361 of the bracket 36. The main body 361 is made of plastic to reduce a weight and manufacturing cost. The base mounts 321 and the housing 10 are electrically coupled together by the conductive member 363, so that electric charge accumulated on the base mounts 321 is discharged through the conductive member 363.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A camera module of an electronic device, the camera module comprising:
   a lens body comprising a base mount; and
   a bracket comprising a main body and a conductive member; wherein:
   the base mount is made of metal, the main body is made of electrically non-conductive material and is configured to fixedly mount the lens body, the conductive member is made of metal;
   the conductive member comprises a mounting end and a coupling end opposite to the mounting end, the coupling end is received within the main body and couples to the base mount, the mounting end protrudes from the main body and is configured to couples to a housing of the electronic device, so that the conductive member is configured to electrically couple the base mount to the housing of the electronic device to discharge electric charge accumulated on the base mount.

2. The camera module of claim 1, wherein:
   the main body defines a mounting hole penetrating through opposite sides of the main body;
   the penetrating hole is configured to receive the lens body to fixedly mount the base mount.

3. The camera module of claim 2, wherein:
   two inner walls of the mounting hole are recessed to define a recessed portion;
   the recessed portion is filled with a colloid to adhere the lens body to the main body.

4. The camera module of claim 2, wherein:
   a quantity of the lens body is two;
   each of the two lens bodies comprises a base mount;
   the main body defines two spaced apart mounting holes to respectively receive and mount the two base mounts.

5. The camera module of claim 4, wherein:
   the main body defines a mounting slot communicating with the two mounting holes;
   the coupling end of the conductive member is partially received in the mounting slot;
   the mounting slot is filled with a conductive adhesive for electrically coupling the two base mounts to the conductive member.

6. An electronic device comprising:
   a housing; and
   a camera module comprising:
      a lens body comprising a base mount; and
      a bracket comprising a main body and a conductive member; wherein:
   wherein the base mount is made of metal, the main body is made of electrically non-conductive material and is configured to fixedly mount the lens body, the conductive member is made of metal;
   the conductive member comprises a mounting end and a coupling end opposite to the mounting end, the coupling end is received within the main body and couples to the base mount, the mounting end protrudes from the main body and is configured to couples to the housing, so that the conductive member is configured to electrically couple the base mount to the housing to discharge electric charge accumulated on the base mount.

7. The electronic device of claim 6, wherein:
   the main body defines a mounting hole penetrating through opposite sides of the main body;
   the penetrating hole is configured to receive the lens body to fixedly mount the base mount.

8. The electronic device of claim 7, wherein:
   two inner walls of the mounting hole are recessed to define a recessed portion;
   the recessed portion is filled with a colloid to adhere the lens body to the main body.

9. The electronic device of claim 7, wherein:
   a quantity of the lens body is two;
   each of the two lens bodies comprises a base mount;
   the main body defines two spaced apart mounting holes to respectively receive and mount the two base mounts.

10. The electronic device of claim 9, wherein:
    the main body defines a mounting slot communicating with the two mounting holes;
    the coupling end of the conductive member is partially received in the mounting slot;
    the mounting slot is filled with a conductive adhesive for electrically coupling the two base mounts to the conductive member.

11. The electronic device of claim 10, wherein:
    the housing comprises a middle frame;
    the middle frame comprises a protrusion block;
    one end of the conductive member is fixedly mounted to the protrusion block.

12. The electronic device of claim 11, wherein:
    a width of the mounting end is greater than a width of the coupling end;

a width of the coupling end is greater than a spacing between the two mounting holes;

the coupling end is inserted into the main body;

the mounting end is fixedly mounted to the protrusion block.

13. The electronic device of claim 12, wherein:

the mounting end comprises a plurality of protrusions configured to improve contact with the protrusion block.

14. The electronic device of claim 12, wherein:

the mounting end is mounted to the middle frame by screws, conductive adhesive, or solder.

* * * * *